(12) United States Patent
Zhu et al.

(10) Patent No.: US 8,954,494 B2
(45) Date of Patent: Feb. 10, 2015

(54) METHOD AND SYSTEM FOR SYNCHRONIZING OPERATIONS OF MULTIPLE GROUPS

(75) Inventors: Xi Zhu, Shenzhen (CN); Xiaojun Zeng, Shenzhen (CN); Shugen Chen, Shenzhen (CN); Shan Zhang, Shenzhen (CN); Chao Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 236 days.

(21) Appl. No.: 13/460,853

(22) Filed: May 1, 2012

(65) Prior Publication Data

US 2012/0215841 A1   Aug. 23, 2012

Related U.S. Application Data

(63) Continuation of application No. PCT/CN2011/071951, filed on Mar. 18, 2011.

(30) Foreign Application Priority Data

Mar. 18, 2010 (CN) .......................... 2010 1 0139002

(51) Int. Cl.
*G06F 15/16* (2006.01)
*H04L 12/58* (2006.01)

(52) U.S. Cl.
CPC .............. *H04L 12/581* (2013.01); *H04L 51/04* (2013.01); *H04L 12/588* (2013.01)
USPC ........... 709/203; 709/204; 709/206; 709/223; 370/351

(58) Field of Classification Search
CPC ....... G06F 15/16; H04L 12/581; H04L 51/04; H04L 12/588

USPC ................... 709/202–229; 370/351
See application file for complete search history.

(56) References Cited

U.S. PATENT DOCUMENTS 5,774,668 A * 6/1998 Choquier et al. ............. 709/223
7,543,066 B2 * 6/2009 Colasurdo et al. ............ 709/228
(Continued)

FOREIGN PATENT DOCUMENTS

CN   1832414 A   9/2006
CN   1832414 A   9/2006
(Continued)

OTHER PUBLICATIONS

International Search Report in Chinese and English Translation dated Jun. 2, 2011.

*Primary Examiner* — Wing F. Chan
*Assistant Examiner* — Razu Miah
(74) *Attorney, Agent, or Firm* — Anova Law Group, PLLC (57) ABSTRACT

A method is disclosed for synchronizing operations of at least a first group on a first server and a second group on a second server. The method includes establishing an association between the first group and the second group using a pre-set association identifier, receiving operation information containing a type of operation and specifying an operation, and performing the operation specified by the operation information on the first group. The method also includes sending the operation information and the association identifier to the second server, receiving the operation information and the association identifier, and searching the second group corresponding to the association identifier. Further, the method includes performing an operation corresponding to the type of the operation information on the second group based on the type of the operation information.

13 Claims, 5 Drawing Sheets

(56) References Cited

U.S. PATENT DOCUMENTS

| | | | |
|---|---|---|---|
| 7,613,794 B2* | 11/2009 | Delaney et al. | 709/219 |
| 7,921,317 B2* | 4/2011 | Malek | 713/375 |
| 2001/0016875 A1* | 8/2001 | Schwartz et al. | 709/206 |
| 2002/0161839 A1* | 10/2002 | Colasurdo et al. | 709/204 |
| 2003/0147392 A1* | 8/2003 | Hayashi et al. | 370/390 |
| 2003/0217096 A1* | 11/2003 | McKelvie et al. | 709/202 |
| 2004/0010606 A1* | 1/2004 | Delaney et al. | 709/229 |
| 2005/0138178 A1* | 6/2005 | Astarabadi | 709/227 |
| 2005/0174988 A1* | 8/2005 | Bieber et al. | 370/351 |
| 2006/0047741 A1* | 3/2006 | Funada | 709/203 |
| 2006/0173959 A1* | 8/2006 | McKelvie et al. | 709/204 |
| 2007/0129014 A1* | 6/2007 | Bertorello et al. | 455/41.2 |
| 2007/0174389 A1* | 7/2007 | Armstrong et al. | 709/204 |
| 2008/0056289 A1* | 3/2008 | Furukawa et al. | 370/401 |
| 2008/0281931 A1* | 11/2008 | Oh et al. | 709/206 |
| 2008/0285542 A1* | 11/2008 | Jachner | 370/351 |
| 2009/0030982 A1* | 1/2009 | Spivack et al. | 709/204 |
| 2009/0054036 A1* | 2/2009 | Chen et al. | 455/411 |
| 2009/0104894 A1* | 4/2009 | Katis et al. | 455/413 |
| 2009/0132712 A1* | 5/2009 | P et al. | 709/227 |
| 2009/0164587 A1* | 6/2009 | Gavita et al. | 709/206 |
| 2009/0177780 A1* | 7/2009 | Chen | 709/227 |
| 2009/0234922 A1* | 9/2009 | Appelman | 709/206 |
| 2009/0240820 A1* | 9/2009 | Stanford-Clark et al. | 709/228 |
| 2010/0146065 A1* | 6/2010 | Zhu et al. | 709/206 |
| 2012/0124150 A1* | 5/2012 | Ge et al. | 709/206 |

FOREIGN PATENT DOCUMENTS

| | | |
|---|---|---|
| CN | 101605109 A | 12/2006 |
| CN | 101026592 A | 8/2007 |
| WO | 2007021111 A1 | 2/2007 |

* cited by examiner

100

```
┌─────────────────────────────────────────────────────────┐
│ Establishing an association between a first group on a  │  101
│ first server and a second group on a second server      │
│ using a pre-set association identifier                  │
└─────────────────────────────────────────────────────────┘
                          │
                          ▼
┌─────────────────────────────────────────────────────────┐
│ After receiving operation information, the first server │  102
│ performs an operation specified by the operation        │
│ information on the first group                          │
└─────────────────────────────────────────────────────────┘
                          │
                          ▼
┌─────────────────────────────────────────────────────────┐
│ Sending the operation information and the association   │  103
│ identifier to the second server                         │
└─────────────────────────────────────────────────────────┘
                          │
                          ▼
┌─────────────────────────────────────────────────────────┐
│ The second server receives the operation information    │  104
│ and the association identifier                          │
└─────────────────────────────────────────────────────────┘
                          │
                          ▼
┌─────────────────────────────────────────────────────────┐
│ The second server searches the second group             │  105
│ corresponding to the first group based on the           │
│ association identifier                                  │
└─────────────────────────────────────────────────────────┘
                          │
                          ▼
┌─────────────────────────────────────────────────────────┐
│ Based on the type of the operation information, the     │  106
│ second server performs a corresponding operation on     │
│ the second group                                        │
└─────────────────────────────────────────────────────────┘
```

| The client of the SNS group sends the operation information for visiting the shared resources in the IM group and the association identifier of the SNS group to a third server | 301 |

↓

| Based on the association identifier of the SNS group, the third server searches the shared resources of the IM group corresponding to the SNS group | 302 |

↓

| The third server sends the found shared resources of the IM group to the client of the SNS group | 303 |

```
┌─────────────────────────────────────────────────────┐
│ The client of the IM group on the second server    │──── 401
│ sends a request message for querying user          │
│ information to the second server                    │
└─────────────────────────────────────────────────────┘
                        ▼
┌─────────────────────────────────────────────────────┐
│ The second server sends the request message and    │──── 402
│ the association identifier identifying the IM      │
│ group to the first server                           │
└─────────────────────────────────────────────────────┘
                        ▼
┌─────────────────────────────────────────────────────┐
│ The first server receives the request message and  │──── 403
│ the association identifier                          │
└─────────────────────────────────────────────────────┘
                        ▼
┌─────────────────────────────────────────────────────┐
│ The first server queries the SNS group             │──── 404
│ corresponding to the IM group based on the         │
│ association identifier                              │
└─────────────────────────────────────────────────────┘
                        ▼
┌─────────────────────────────────────────────────────┐
│ The first server obtains information corresponding │──── 405
│ to the request message from information of the     │
│ SNS group                                           │
└─────────────────────────────────────────────────────┘
                        ▼
┌─────────────────────────────────────────────────────┐
│ The first server sends the obtained information    │──── 406
│ to the second server                                │
└─────────────────────────────────────────────────────┘
                        ▼
┌─────────────────────────────────────────────────────┐
│ The second server receives the obtained            │──── 407
│ information, and displays the obtained information │
│ on the client of the IM group                       │
└─────────────────────────────────────────────────────┘
```

METHOD AND SYSTEM FOR SYNCHRONIZING OPERATIONS OF MULTIPLE GROUPS

CROSS-REFERENCES TO RELATED APPLICATIONS

This application claims the priority of PCT application no. PCT/CN2011/071951, filed on Mar. 18, 2011, which claims the priority of Chinese patent application no. 201010139002.0, filed on Mar. 18, 2010, the entire contents of all of which are incorporated herein by reference.

FIELD OF THE INVENTION

The present invention relates to the field of Internet technology and, more particularly, relates to techniques for synchronizing operations of multiple groups.

BACKGROUND

With the rapid development of communication technologies, Instant Messaging (IM) has become a mainstream application trend on the Internet. IM not only provides users with a one-to-one chat model, but also provides a many-to-many group model. In the group model, a group message from any member of the group is sent to all other members of the group, and the group information of the group members also needs to be managed.

Correspondingly, in the Social Networking Services (SNS) on the Internet, services similar to the group model are also provided, i.e., the SNS groups, such as classes, groups, and so on.

However, the different group models often do not have connections between each other. For example, with respect to the above mentioned two group models, the group from the network services and the IM group often cannot be combined, the status of these two groups often cannot be related to each other, and any operation on one group model often cannot be reflected in the other group model.

The disclosed methods and systems are directed to solve one or more problems set forth above and other problems.

BRIEF SUMMARY OF THE DISCLOSURE

One aspect of the present disclosure includes a method for synchronizing operations of at least a first group on a first server and a second group on a second server. The method includes establishing an association between the first group and the second group using a pre-set association identifier, receiving operation information containing a type of operation and specifying an operation, and performing the operation specified by the operation information on the first group. The method also includes sending the operation information and the association identifier to the second server, receiving the operation information and the association identifier, and searching the second group corresponding to the association identifier. Further, the method includes performing an operation corresponding to the type of the operation information on the second group based on the type of the operation information.

Another aspect of the present disclosure includes a system for synchronizing operations of multiple groups. The system includes a first server containing an associating module and a second server coupled to the first server. The associating module is configured to establish an association between a first group on the first server and a second group on the second server using a pre-set association identifier. The first server is configured to receive operation information, to perform an operation specified by the operation information on the first group, and to send the operation information and association identifier to the second server. Further, the second server is configured to receive the operation information and the association identifier, to search the second group corresponding to the association identifier, and, based on a type of the operation information, to perform an operation corresponding to the type of the operation information on the second group.

Another aspect of the present disclosure includes a group server. The group server includes an associating module configured to establish an association between a first group on the group server and a second group on another server using a pre-set association identifier. The group server also includes a first operating module configured to, after the group server receives the operation information, perform an operation specified by the operation information on the first group. Further, the group server includes a sending module configured to send the operation information and the association identifier to the other server such that the other server can searching the second group corresponding to the association identifier and performs an operation corresponding to the type specified by the operation information on the second group.

Another aspect of the present disclosure includes a computer-readable medium. The computer-readable medium contains executable computer program, when executed by one or more processors, for performing a method for synchronizing operations of at least a first group on a first server and a second group on a second server. The method includes establishing an association between the first group and the second group using a pre-set association identifier, receiving operation information containing a type of operation and specifying an operation, and performing the operation specified by the operation information on the first group. The method also includes sending the operation information and the association identifier to the second server, receiving the operation information and the association identifier, and searching the second group corresponding to the association identifier. Further, the method includes performing an operation corresponding to the type of the operation information on the second group based on the type of the operation information.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 6:
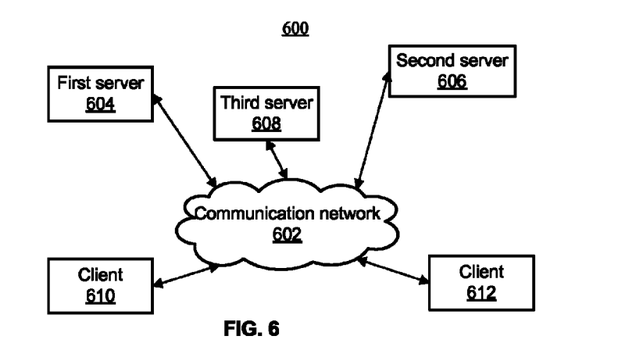
FIG. 6 illustrates an exemplary environment incorporating certain disclosed embodiments.

FIG. 6 illustrates an exemplary environment 600 incorporating certain disclosed embodiments of the present invention. As shown in FIG. 6, environment 600 may include a communication network 602, a first server 604, a second server 606, a third server 608, a client 610, and a client 612. The number of the servers and clients are used for illustrative purposes, any number of servers and clients may be included.

A server, as used herein, may refer to any appropriate computer system for hosting one or more group, such as an SNS group and/or IM group. For example, first server 604 may host or have a first group, second server 606 may host or have a second group, and third server 608 may host or have shared resources from the first server 604 and second server 606 (the first server 604 and the second server 606 may also be called group servers). The first server 604, the second server 606, and the third server 608 may communicate with each other over communication network 602.

Although the first server 604, the second server 606, and the third server 608 are shown as separate servers, some or all of the first server 604, the second server 606, and the third server 608 may coincide in one server or computer system.

A server may also include certain components or devices to carry out various functionalities. For example, a server may include a processor, memory modules such as ROM, RAM, and flash memory modules, storage medium such as CD-ROM, U-disk, removable hard disk, etc., I/O devices such as keyboard and mouse, network devices for establishing connections through the communication network 502, and database(s) for storing certain operational and system data. Other devices may also be included.

Further, client 610 and client 612 may be any appropriate client terminal of any of the servers, i.e., any appropriate user terminal with certain computing capabilities, such as a personal computer (PC), a work station computer, a server computer, a hand-held computing device (tablet), a smart phone or mobile phone, or any other user-side computing device. For example, client 610 may be a client of first server 604, second server 606, and/or third server 608, and client 610 may also be a client of first server 604, second server 606, and/or third server 608. Other configurations may also be used. For example, in certain embodiments, client 610 and client 612 may be coincide in a single client, and client 610 and/or client 612 may be coincide with server 604 and/or server 606, etc.

Further, client 610 and/or client 612 may communicate with the first server 604, second server 606, and/or third server 608 through a direct connection or through communication network 602. Different servers may have different storage formats and coding formats, etc. A format conversion system may be configured at the server side to allow communications between different servers and/or between servers and clients.

Communication network 602 may include any appropriate type of communication network for providing network connections to the servers 604, 606, and 608 and/or clients 610 and 612. For example, communication network 602 may include the Internet or other type of computer network or telecommunication network, either wired or wireless based on certain network protocols, such as HTTP, TCP, UDP, etc.

For illustrative purposes, the first server 604 may have an SNS group (a first group), and the second server 606 may have an IM group (a second group). An SNS group, as used herein, may refer to the SNS group involving interactions among contact people, that is, a group formed by multiple people based on a certain Internet SNS community, such as an alumni class using the name of the class and school as the unit or an interest group using certain common interest as the unit, etc. For example, the SNS group may include users, user information, a user list, and shared resources, etc. The user information may include, but not limited to, user name, IM number, user ID, and class name, etc.

An IM Group, as used herein, may refer to an Internet-based real-time communication group with a large number of people, that is, a group formed by multiple people on a server for a same type IM tool, such as an MSN group and a QQ group, etc. The IM group may include group members, group information, a group member list, and shared resources, etc. The group information may include, but not limited to, class group ID, class group itself, member data and information, class, age, school, and other key information. The first and second groups may also be two other groups on the Internet or have a collective relationship.

Figure 1:
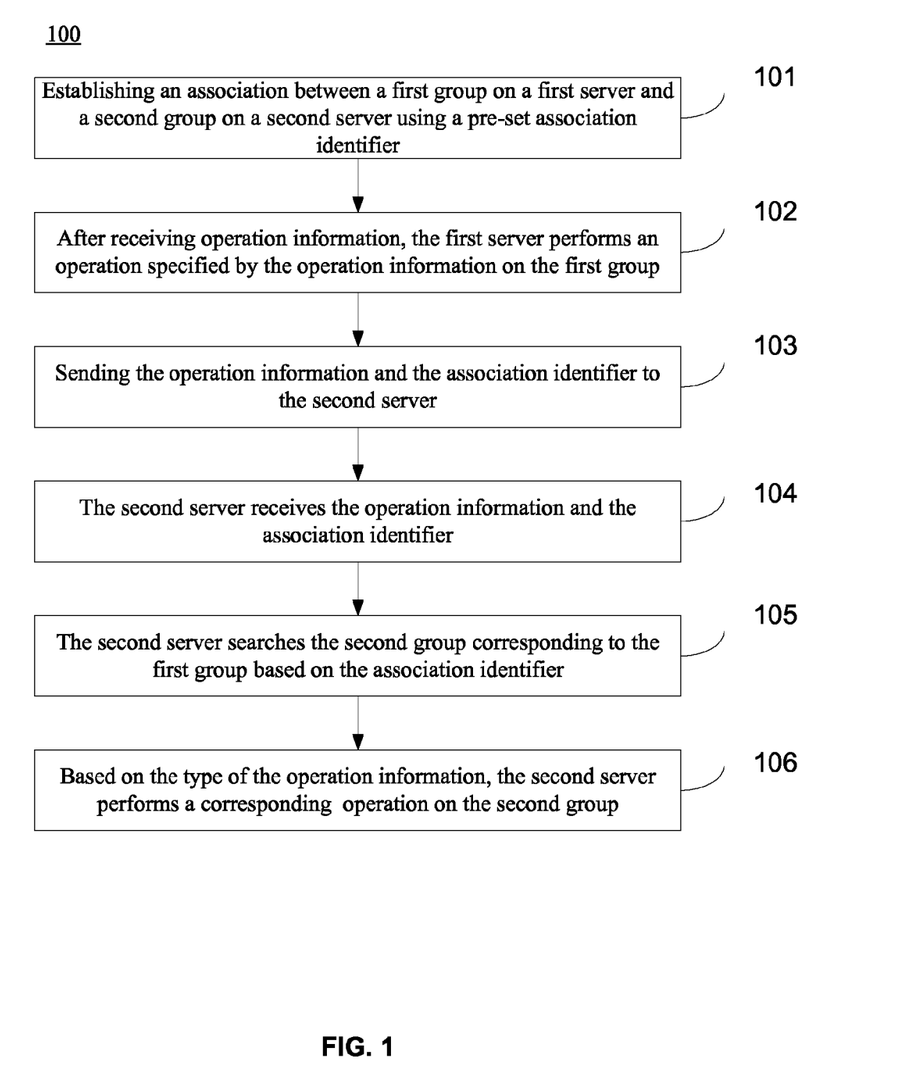
FIG. 1 illustrates an exemplary process for synchronizing operations of multiple groups consistent with the disclosed embodiments.

The first server 604 and/or the second server 606 may be configured to perform certain operations on the SNS group and the IM group and the operations may be synchronized cross these two or more groups. FIG. 1 illustrates an exemplary process 100 for synchronizing operations of multiple groups.

As shown in FIG. 1, at the beginning, an association may be established between the first group on the first server and the second group on the second server using a pre-set association identifier (101).

The first server may receive operation request or operation information from a user on a client of the first server. After receiving the operation information, the first server may perform an operation specified by the operation information on the first group, such as a binding or unbinding operation (102). Multiple operations may also be requested and performed.

Further, the first server sends the operation information and the association identifier to the second server (103); and the second server receives the operation information and the association identifier (104).

After receiving the operation information and the association identifier, the second server searches a second group corresponding to the first group based on the association identifier (105). Further, the second server performs an operation corresponding to the type specified by the operation information on the second group (106).

Figure 2:
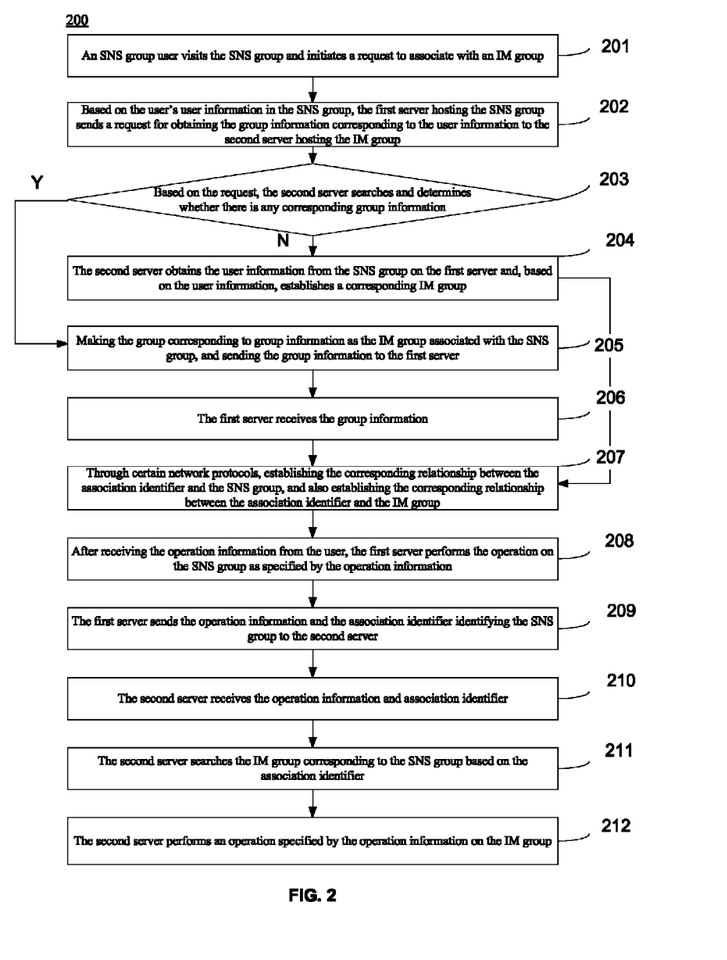
FIG. 2 illustrates another exemplary process for synchronizing operations of multiple groups consistent with the disclosed embodiments.

FIG. 2 illustrates a more detailed exemplary process 200 for synchronizing the operations of multiple groups. As shown in FIG. 2, an SNS group user or a corresponding computer program may visit the SNS group on the client and may initiate a request to associate with an IM group (201). When the user requesting the association is an administrator of the SNS group and/or the corresponding IM group, the user may directly start the association, without asking whether the association operation is allowed;

On the other hand, when the user requesting the association is an ordinary member of the SNS group and/or the corresponding IM group, the user can request the administrator of the SNS group and/or the corresponding IM group via mail or intra-group mail, etc., to associate these two groups.

Based on the user's user information in the SNS group, the first server hosting the SNS group sends a request for obtaining the group information corresponding to the user information to the second server hosting the IM group (202). Optionally, the user information and/or group information may be encrypted according to the pre-set configuration between the servers or between the groups.

Further, based on the received request, the second server searches and determines whether there is any group information corresponding to the user information on the second server (203). The second server may perform the searching using any appropriate information to determine whether there is corresponding group information. For example, the second server may use the ID of the user requesting to associate with the IM group to search the group containing the ID of the user on the second server. More specifically, the information filled by the user in the SNS group may include the user's IM number. The IM number may then be used to query whether the IM number belongs to any group on the second server.

If the IM number belongs to one or more group, the second server has corresponding group information; if the IM number does not belong to any group, the second server does not have corresponding group information. Further, in addition to the user's ID, other information can also be used to perform the search, such as the name of the user's SNS group or the other information of the user in the SNS group (including the related school and related district, etc.).

The second server may have the IM group corresponding to the SNS group, or the second server might not have the IM group corresponding to the SNS group. If the second server determines there is not corresponding group information (203; N), the second server may obtain the user information from the SNS group on the first server and, based on the user information, establish a corresponding IM group (204). That is, when there is no corresponding IM group, the user information may be obtained from the SNS group on the first server, and an IM group may be created based on the user's requirement. After the corresponding IM group is established, the group information may be sent to the first server and the process 200 continues to 206.

On the other hand, if the second server determines there is corresponding group information (203; Y), the second server may make the group corresponding to group information as the IM group associated with the SNS group, and sending the group information to the first server (205).

Additionally or optionally, the second server may choose multiple corresponding IM groups based on the request, determine at least one IM group to be associated based on the user's instruction; and then send the group information of the determined IM group to the first server.

The first server receives the group information corresponding to the user information from the second server (206). Additionally, the first server may selectively store the received group information based on the user's need. If the information of the two groups is not symmetric, i.e., the group information or the group members of these two groups are not consistent, according to user settings, information of one group may be obtained to the other group. That is, using the information from the one group as the basis to synchronize the data of the two groups.

After receiving the group information corresponding to the user information (206), and through certain network protocols, the first server establishes the corresponding relationship between the association identifier and the SNS group, and also establishes the corresponding relationship between the association identifier and the IM group (207).

Further, if the first group has corresponding shared resources, and/or the second group has corresponding share resources, the first server and/or the second server may establish the corresponding relationship between the association identifier and the shared resources in the first group, and/or establishing the corresponding relationship between the association identifier and the shared resources in the second group.

Further, after associating together these groups, the user list of the SNS group (or the IM group) may be presented to the IM group (or the SNS group), and annotations may be added according to the user's status in the IM group (or SNS groups). For example, if the SNS group includes a user A and the user A did not join the IM group, the status of A on the user list may be annotated with "have not joined the IM group" or other information.

Further, the association identifier may be used to associate together groups from two different servers in subsequent operation synchronizing processes.

The association identifier may be pre-set by the first server and the second server via negotiation; or one party may set the association identifier and notify the other party. Because the association identifier has a corresponding relationship with the other party, the corresponding other party can be determined by the association identifier.

For example, if the first server sets the association identifier and notifies the second server, because the association identifier has a corresponding relationship with the second group on the second server, the second group corresponding to the first group on the first server can be determined by the association identifier. When a client has multiple second groups, any two of these second groups may correspond to a same association identifier or may correspond to different association identifiers.

For example, if the first group is an SNS group, the second group of the client is the corresponding IM group, and there are two IM groups, then an association identifier 1 may be set for the SNS group, and the association identifier 1 may also be set for the two IM groups. Or association identifier 1, association identifier 2, and association identifier 3 may be set for the SNS group and two IM groups, respectively, while the association identifier 1 corresponds to association identifier 2 and association identifier 3.

In addition, the association identifier may be a group number. The content of the association identifier is not limited and can be defined in any form, such as letters, numbers, and strings, etc. Further, when the association identifier is sent to the second server, the location of the association identifier with respect to other information is also not limited and can be defined as needed. For example, the association identifier may be defined as a prefix or suffix of other information. As long as the association identifier can be recognized by the first server and the second server, no specific limitation is provided by the disclosed embodiments of the present.

After associating the SNS group with the IM group (207), the first server and the second server (i.e., the SNS group and the IM group) may be ready for synchronizing operations of multiple groups. For example, after the two groups establish the association relationship, when a user logs in any group, the user can view the information of group(s) associated with that group. More specifically, when a user logs in the IM group, the user can view information of the SNS group associated with the IM group, and the information may include the class name, enrollment year, number of class members, and class leader, etc. When the user logs in the SNS group, the user can view information of the IM group associated with the SNS group, and the information may include group name, ID, and so on.

The operations may be synchronized based on a variety of operation information, such the type of operation, the content of operation, and the action of operation, etc. In certain embodiments, operation information made by the user in a group may be categorized into various types such as operations on the relationship chain, operations on posting information, operations on visiting shared resources, and operations on searching relevant user information. Other types of operations may also be used.

Operations on the relationship chain may refer to operations on the user's attributes and the relationship chain between users, such as operations for deleting a user, joining the group, setting the administrator, and setting group owner transfer, etc.;

Operations on posting information are not operations on the relationship chain, but rather are operations initiated by the user, such as posting logs, posting micro-blog, modifying status, posting messages, and writing mood, etc.;

Operations on visiting shared resources may refer to the user visiting the resources stored on the server, such as operations for accessing the e-mail system, viewing the album, sharing files, and downloading, etc.

Operations on searching relevant user information may refer to operations for searching user information, and accessing the group member list, group member card, group member photo, and recent operations, etc.

FIG. 2 continues illustrating the operation synchronizing process 200 when the operation specified by the operation information is an operation on the relationship chain.

After receiving the operation information specifying the operation, the first server performs the operation on the SNS group as specified by the operation information (208). Further, when the first server performs the specified operation, it may need to verify the client's authority. Only those clients with user privilege in the SNS group and user privilege in the IM group can complete the above operations by communicating with the server.

Further, the first server sends the operation information and the association identifier identifying the SNS group to the second server (209). The first server may send the operation information and association identifier by any appropriate means, such as report or e-mail, etc., based on certain network protocol, such as HTTP, TCP or UDP, etc.

The second server receives the operation information and association identifier (210). Additionally or optionally, due to potentially different data formats and storage formats on these two servers, the receiving server may convert the information from the other server into a format that can be understood by the receiving server.

Further, the second server searches the IM group corresponding to the SNS group based on the association identifier (211). More specifically, the IM group corresponding to the SNS group is the previous group when the association is established. The IM group may be one group or multiple groups. An SNS group can correspond to multiple IM groups, and, similarly, an IM group can correspond to multiple SNS groups. When there is a one-to-multiple situation, operations on one group may be synchronized into other groups, or selectively to certain groups based on the user settings.

When selecting the certain group or groups, the relationship chain overlapping degree (the degree of overlapping between the members of the SNS group and the members of the IM group) may need to be calculated. Preferably, the overlapping degree between the SNS group and IM group can reach a one-to-one level, i.e., the relationship chain is the same. At this time, synchronized operations in the SNS group and IM group can be carried out.

The second server performs an operation specified by the operation information on the IM group (212). More specifically, the client of the IM group can choose whether to carry out such operation based on the contents of the operation information. The IM group may prompt the operation information to the client. If the user chooses to accept the operation, the client continues the operation; if the user chooses not to accept the operation, the client may stop carrying out the operation. Whether or not the second server performs this operation may be determined by an agreement between the second server and the user. Further, the second server can also display the content of the operation information on the client of the IM group.

Although the above described interactions reflect the process of synchronizing a relationship chain operation into the IM group when the user performs the relationship chain operation on the SNS group. When there is any relationship chain operation on the IM group, such operation can also be synchronized similarly.

When the operation specified by the operation information is an operation for posting information, where operations for posting information refer to operations used by the user to post logs, send group messages, change status, and post photos, etc., but not operations on the relationship chain, the second server may also display content of the operation information on the client of the IM group when performing the specified operation (212).

For example, when a user in the SNS group posts a new log, the first server sends the operation for posting the log and the association identifier identifying the SNS group to the second server. In addition to the interactions indicated in the 210 and 211 above, the second servers also displays the operation for posting the log on the client of the IM group. For example, it may display "the user posted a log 'Life'" on the client of the IM group. This operation can contain specific contents of the posted log, and the specific contents may be pulled through the http protocol, udp protocol, or tcp protocol.

Although the above describes synchronizing operations for posting information to the IM group when the user performs information posting operations in the SNS group, similar interactions can be used to perform synchronization when information posting operations occur in the IM group, such as posting new logs or generating chat messages or pictures, etc.

Figure 3:
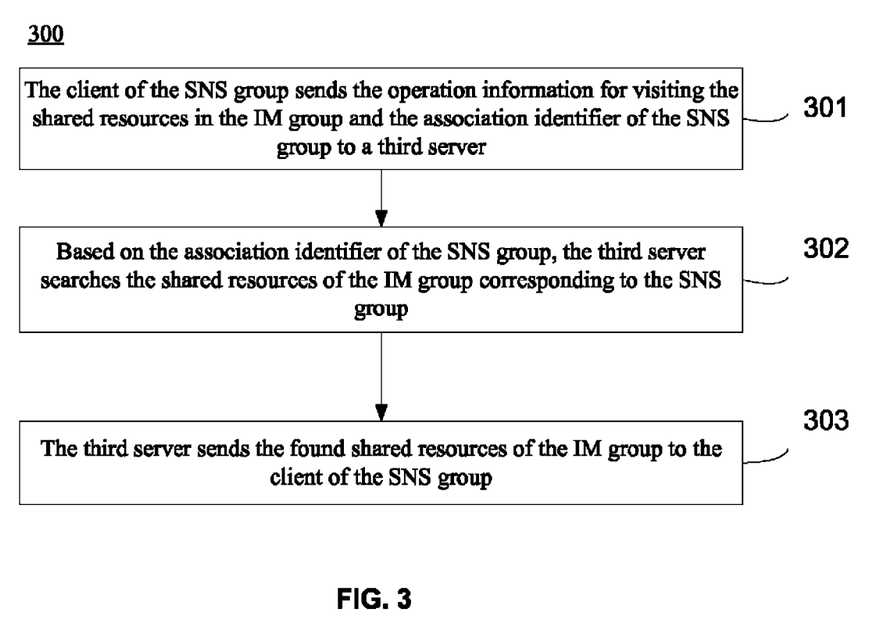
FIG. 3 illustrates another exemplary process for synchronizing operations of multiple groups consistent with the disclosed embodiments.

FIG. 3 illustrates an exemplary process 300 for synchronizing operations of multiple groups when the operation specified by the operation information is an operation in the SNS group for visiting shared resource in the IM group. As shown in FIG. 3, the client of the SNS group may send the operation information for visiting the shared resources in the IM group and the association identifier of the SNS group to a third server (301). Such visiting may including the client visiting any data stored on the server, such as operations for accessing e-mail, viewing the album, sharing files, and downloading, etc.

The third server may be a server storing the share resources between the first server and the second server. The first server may download the shared resources of the second server from the third server, or may share the shared resources with the second server through the third server. For example, the third server can be a mail system server.

The three servers may communicate with one another through the association identifier. Further, the third server may have a resource list and SNS groups stored with IM group numbers, such as: file list, album list and so on. In addition, a corresponding resource(s) can also be obtained through a returned resource ID.

Further, based on the association identifier of the SNS group, the third server searches the shared resources of the IM group corresponding to the SNS group (302). The third server may find the corresponding resource list based on the group number of the IM group, and the resource list may include the ID of the corresponding resource. After searching the shared resources, the third server sends the found shared resources of the IM group to the client of the SNS group (303).

It should be noted that, although the disclosed embodiments describe the process for searching shared resources from the third server based on the association identifier and sending the shared resource to the requester when the user performs shared resource visiting operations in the SNS group, the same principle can be used when the user performs shared resource visiting operations in the IM group, the details of which are omitted herein.

Figure 4:
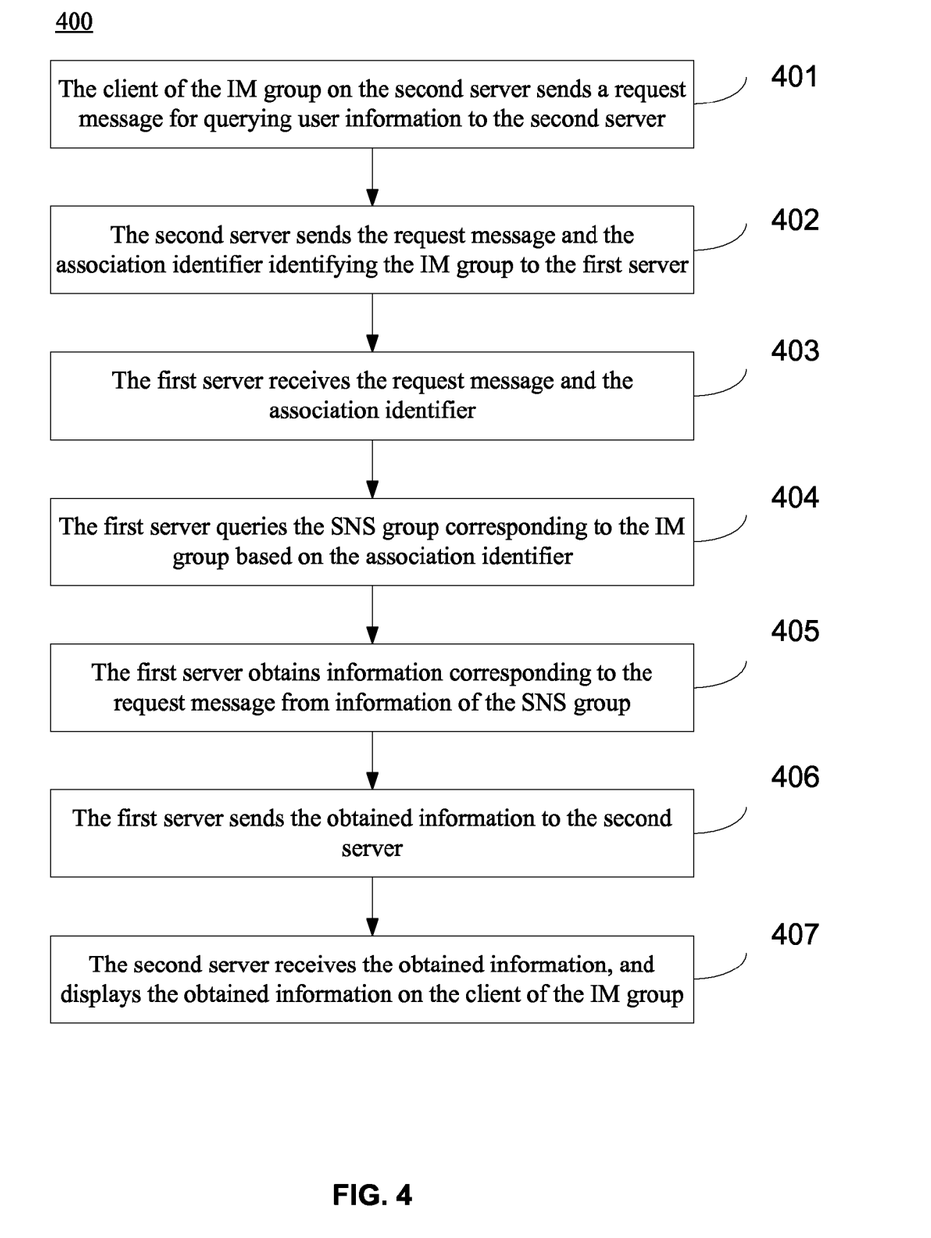
FIG. 4 illustrates another exemplary process for synchronizing operations of multiple groups consistent with the disclosed embodiments.

Further, the above disclosed embodiments describe the process for synchronizing operations on the SNS group to the IM group. When a user performs an operation on the client of the IM group and the operation specified by the operation information is querying related user information in the IM group, such as querying user information and accessing group member list, group member card, group member photo, and recent operations, etc., such operation may also be synchronized to the SNS group. FIG. 4 illustrates an exemplary operation synchronizing process.

As shown in FIG. 4, the client of the IM group on the second server may send a request message for querying certain user information to the second server (401). The second server may then send the request message and the association identifier identifying the IM group to the first server (402).

The first server may receive the request message and the association identifier (403). The first server may also query the SNS group corresponding to the IM group based on the association identifier (404). Further, the first server may obtain information corresponding to the request message from information of the SNS group (405).

After obtaining the corresponding information, the first server sends the obtained information to the second server (406). The second server receives the obtained information, and displays the obtained information on the client of the IM group (407). Other actions may also be included in process 400.

Additionally or optionally, if the operation in the IM group or the SNS group is an operation that needs to notify the user through mail or tips as preconfigured by the user, when this type of operation occurs, the network side may notify the user of the operation on the group by mail or tips.

Figure 5:
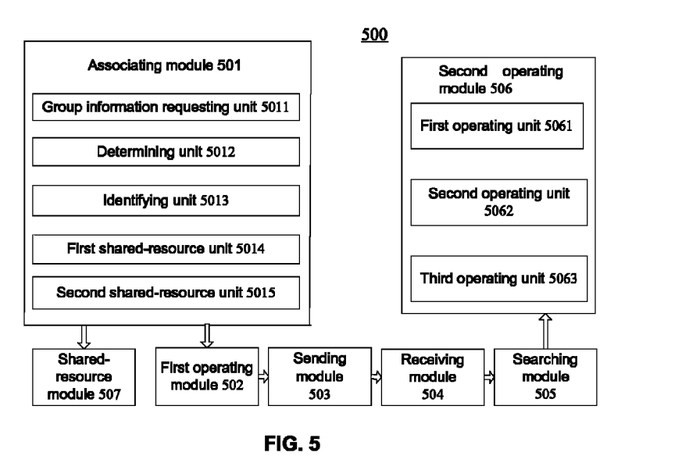
FIG. 5 illustrates a block diagram of an exemplary server for synchronizing operations of multiple groups consistent with the disclosed embodiments.

Returning to FIG. 6, the first server 604, the second server 606, and the third server 608 may be implemented through hardware, software, or a combination of hardware and software. FIG. 5 illustrates an exemplary server 500 for implementing the first server 604, the second server 606, and/or the third server 608 for synchronizing operations of multiple groups.

As shown in FIG. 5, server 500 may include an associating module 501, a first operating module 502, a sending module 503, a receiver module 504, a searching module 505, and a second operating module 506. Certain module(s) may be omitted and other modules may be added.

The associating module 501 may be configured to establish an association between a first group on a first server and a second group on a second server using a pre-set association identifier. The first operating module 502 may be configured to, after the first server receives the operation information, perform an operation specified by the operation information on the first group.

The sending module 503 may be configured to send the operation information and the association identifier to the second server, and the receiver module 504 may be configured to, for the second server, receive the operation information and the association identifier.

Further, the searching module 505 may be configured to, for the second server, search the second group corresponding to the first group based on the association identifier. The second operating module 506 may be configured to, for the second server, perform an operation corresponding to the type specified by the operation information on the second group.

More particularly, the associating module 501 may further include a group information request unit 5011, a determining unit 5012, and an identifying unit 5013. The group information request unit 5011 may be configured to, for the first server and based on the user information in the first group, send a request for obtaining the group information corresponding to the user information to the second server having the second group.

The determining unit 5012 may be configured to, for the second server and based on the request, search and determine whether there is any group information corresponding to the user information on the second server. If the determining unit 5012 determines there is corresponding group information, determining unit 5012 may make the group corresponding to the group information as the second group, and send the group information to the first server. On the other hand, if the determining unit 5012 determines there is not corresponding group information, the determining unit 5012 may create a second group corresponding to the user information in the first group on the second server.

Further, the identifying unit 5013 may be configured to establish the corresponding relationship between the association identifier and the first group, and also the corresponding relationship between the association identifier and the second group.

In addition, the associating module 501 may also include a first shared-resource associating unit 5014 and second shared-resource associating unit 5015. The first shared-resource associating unit 5014 may be configured to establish the corresponding relationship between the association identifier and the shared resources corresponding to the first group. The second shared-resource associating unit 5015 may be configured to establish the corresponding relationship between the association identifier and the shared resources corresponding to the second group.

The second operating module 506 may further include a first operating unit 5061, a second operating unit 5062, and a third operating unit 5063. The first operating unit 5061 may be configured to perform the operation on the second group as specified by the operation information when the operation specified by the operation information received by the second server is an operation on the relationship chain.

The second operating unit 5062 may be configured to send the contents of the operation information to the second group when the operation specified by the operation information received by the second server is an operation for posting information.

Further, the third operating unit 5063 may be configured to search the relevant user information in the second group and to return the found user information to the second server when the operation specified by the operation information received by the second server is an operation for querying relevant user information in the first group.

Additionally or optionally, the server 500 may also include a shared-resource module 507. The shared-resource module 507 may be configured to search the shared resources based on the association identifier and to send the shared resources to the first group, when the third server receives the operation information and the association identifier, and the operation specified by the operation information is an operation for visiting the shared resources of the second group.

By establishing an association between the SNS group and the corresponding IM group and carrying out real-time information interaction between the groups of these two models using certain network protocols, operations of the group of one model can be reflected in the associated group, and resources of the group of one model can be shared by the associated group. Thus, members of one group (SNS or IM group) can use this real-time interaction to manage the information in the associated group (IM or SNS group), and the dependence and interaction between the groups of the two models can be increased. Other applications, advantages, alternations, modifications, or equivalents to the disclosed embodiments are obvious to those skilled in the art.

What is claimed is:

1. A method for synchronizing operations of at least a first user group on a first server and a second user group on a second server, comprising:
    establishing, by the first server, an association between the first user group and the second user group using a pre-set association identifier;
    receiving, by the first server, operation information containing a type of operation and specifying an operation;
    performing, by the first server, the operation specified by the operation information on the first user group;
    sending, by the first server, the operation information and the association identifier to the second server;
    receiving, by the second server, the operation information and the association identifier;
    searching, by the second server, the second user group corresponding to the association identifier; and
    performing, by the second server, an operation corresponding to the type of the operation information on the second user group based on the type of the operation information,
    wherein establishing the association between the first user group and the second user group further includes:
    based on user information of the first user group, sending, by the first server, a request for obtaining group information corresponding to the user information to the second server of the second user group;
    searching and determining, by the second server and based on the request, whether there is group information corresponding to the user information on the second server;
    when it is determined there is corresponding group information, making the group corresponding to the group information the second user group and sending the group information to the first server;
    when it is determined there is not corresponding group information, creating the second user group corresponding to the user information of the first user group and sending the group information of the second user group to the first server; and
    establishing a corresponding relationship between the association identifier and the first user group and a corresponding relationship between the association identifier and the second user group.

2. The method according to claim 1, after establishing a corresponding relationship between the association identifier and the first user group and a corresponding relationship between the association identifier and the second user group, further including:
    establishing a corresponding relationship between the association identifier and a shared resource corresponding to the first user group; and
    establishing a corresponding relationship between the association identifier and a shared resource corresponding to the second user group.

3. The method according to claim 2, further including:
    when a third server receives the operation information and the association identifier and the operation specified by the operation information is an operation for visiting the share resource of the second user group, searching, by the third server, the shared resource based on the association identifier and sending the shared resource to the first user group.

4. A method for synchronizing operations of at least a first user group on a first server and a second user group on a second server, comprising:
    establishing, by the first server, an association between the first user group and the second user group using a pre-set association identifier;
    receiving, by the first server, operation information containing a type of operation and specifying an operation;
    performing, by the first server, the operation specified by the operation information on the first user group;
    sending, by the first server, the operation information and the association identifier to the second server;
    receiving, by the second server, the operation information and the association identifier;
    searching, by the second server, the second user group corresponding to the association identifier; and
    performing, by the second server, an operation corresponding to the type of the operation information on the second user group based on the type of the operation information,
    wherein performing the operation corresponding to the type of the operation information on the second user group further includes:
    when the operation specified by the operation information received by the second server is an operation on a relationship chain, performing the operation on the second user group as specified by the operation information;
    when the operation specified by the operation information received by the second server is an operation for posting information, sending contents of the operation information to the second user group; and
    when the operation specified by the operation information received by the second server is an operation for querying relevant user information in the first user group, searching the relevant user information in the second user group and returning the found user information to the second server.

5. The method according to claim 4, wherein establishing the association between the first user group and the second user group further includes:
    based on user information of the first user group, sending, by the first server, a request for obtaining group information corresponding to the user information to the second server of the second user group;
    searching and determining, by the second server and based on the request, whether there is group information corresponding to the user information on the second server;
    when it is determined there is corresponding group information, making the group corresponding to the group information the second user group and sending the group information to the first server;

when it is determined there is not corresponding group information, creating the second user group corresponding to the user information of the first user group and sending the group information of the second user group to the first server; and establishing a corresponding relationship between the association identifier and the first user group and a corresponding relationship between the association identifier and the second user group.

6. The method according to claim 5, after establishing a corresponding relationship between the association identifier and the first user group and a corresponding relationship between the association identifier and the second user group, further including:

establishing a corresponding relationship between the association identifier and a shared resource corresponding to the first user group; and establishing a corresponding relationship between the association identifier and a shared resource corresponding to the second user group.

7. The method according to claim 6, further including:

when a third server receives the operation information and the association identifier and the operation specified by the operation information is an operation for visiting the share resource of the second user group, searching, by the third server, the shared resource based on the association identifier and sending the shared resource to the first user group.

8. A group server for communicating with a first server, wherein the first server is configured to establish an association between a first user group on the first server and a second user group on the group server using a pre-set association identifier; and to send the operation information and the association identifier to the group server, the group server comprising:

a plurality of memory modules; and
a processor configured to:
receive a request for obtaining group information corresponding to the user information sent by the first server to the group server based on user information of the first user group;
search and determine, based on the request, whether there is group information corresponding to the user information on the group server;
when it is determined there is corresponding group information, make the group corresponding to the group information the second user group and sending the group information to the first server;
when it is determined there is not corresponding group information, create the second user group corresponding to the user information of the first user group and sending the group information of the second user group to the first server;
establish a corresponding relationship between the association identifier and the first user group and a corresponding relationship between the association identifier and the second user group; and
search the second user group corresponding to the association identifier and performs an operation corresponding to the type specified by the operation information on the second user group.

9. The group server according to claim 8, further including:
send the operation information and the association identifier to the first server to cause the first server to:
search the first user group corresponding to the association identifier from the group server; and
based on a type of the operation information sent from the group server, perform an operation corresponding to the type of the operation information from the group server on the first user group.

10. A non-transitory computer-readable medium having executable computer program, when executed by one or more processors, for performing a method for synchronizing operations of at least a first user group on a first server and a second user group on a second server, comprising:

establishing, by the first server, an association between the first user group and the second user group using a pre-set association identifier;

receiving, by the first server, operation information containing a type of operation and specifying an operation;

performing, by the first server, the operation specified by the operation information on the first user group;

sending, by the first server, the operation information and the association identifier to the second server;

receiving, by the second server, the operation information and the association identifier;

searching, by the second server, the second user group corresponding to the association identifier; and performing, by the second server, an operation corresponding to the type of the operation information on the second user group based on the type of the operation information, wherein performing the operation corresponding to the type of the operation information on the second user group further includes:

when the operation specified by the operation information received by the second server is an operation on a relationship chain, performing the operation on the second user group as specified by the operation information;

when the operation specified by the operation information received by the second server is an operation for posting information, sending contents of the operation information to the second user group; and when the operation specified by the operation information received by the second server is an operation for querying relevant user information in the first user group, searching the relevant user information in the second user group and returning the found user information to the second server.

11. The non-transitory computer-readable medium according to claim 10, wherein establishing the association between the first user group and the second user group further includes:

based on user information of the first user group, sending, by the first server, a request for obtaining group information corresponding to the user information to the second server of the second user group;

searching and determining, by the second server and based on the request, whether there is group information corresponding to the user information on the second server;

when it is determined there is corresponding group information, making the group corresponding to the group information the second user group and sending the group information to the first server;

when it is determined there is not corresponding group information, creating the second user group corresponding to the user information of the first user group and sending the group information of the second user group to the first server; and establishing a corresponding relationship between the association identifier and the first user group and a corresponding relationship between the association identifier and the second user group.

12. The non-transitory computer-readable medium according to claim 10, after establishing a corresponding relationship between the association identifier and the first user group and a corresponding relationship between the association identifier and the second user group, the method further including:
- establishing a corresponding relationship between the association identifier and a shared resource corresponding to the first user group; and
- establishing a corresponding relationship between the association identifier and a shared resource corresponding to the second user group.

13. The non-transitory computer-readable medium according to claim 12, the method further including:
- when a third server receives the operation information and the association identifier and the operation specified by the operation information is an operation for visiting the share resource of the second user group, searching, by the third server, the shared resource based on the association identifier and sending the shared resource to the first user group.

* * * * *